Sept. 25, 1934.                J. M. MARTY                1,974,501
                              FOOD CUTTER
                          Filed July 3, 1933            4 Sheets-Sheet 1
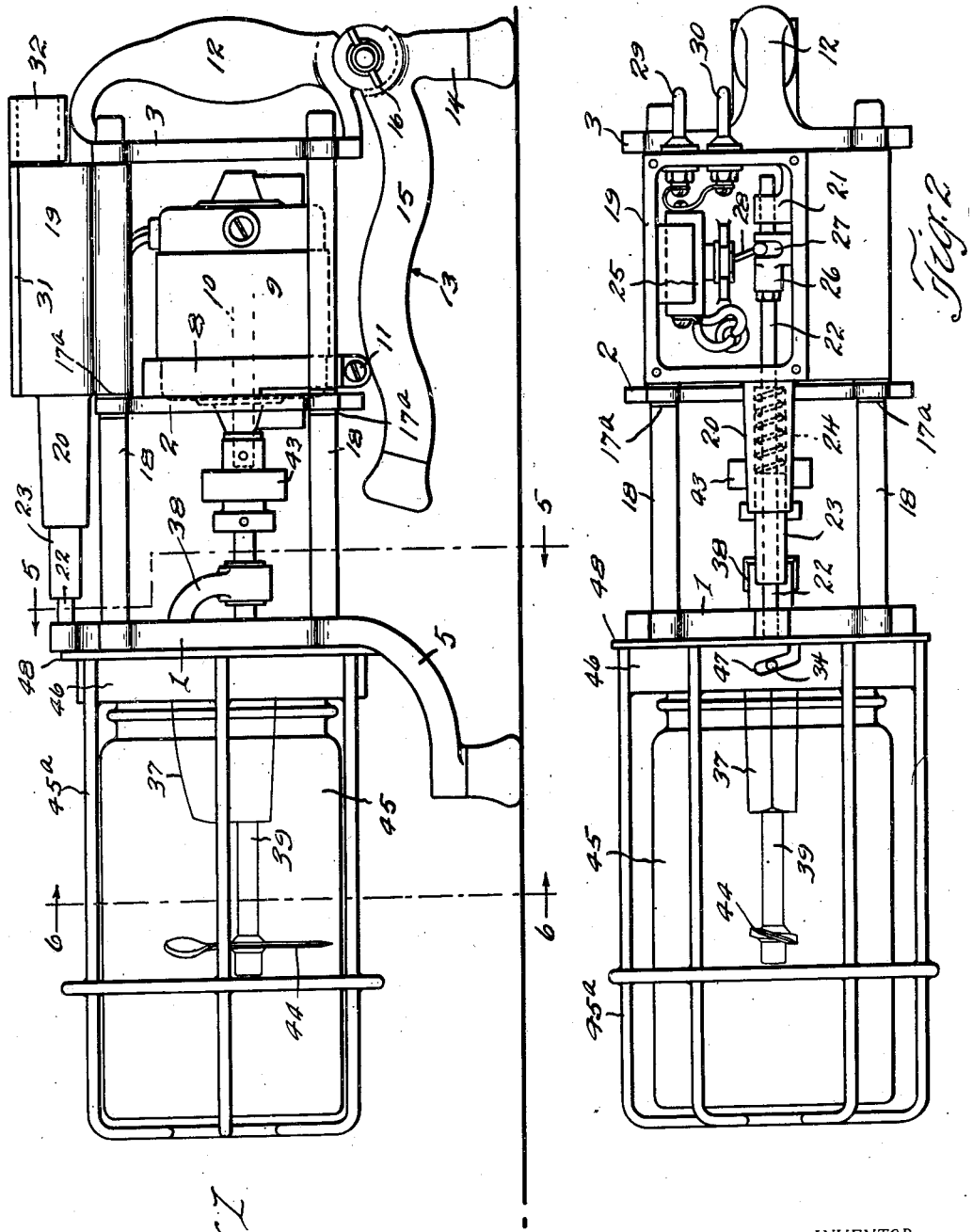
INVENTOR.
J. M. Marty
BY
Hull, Brock & West
ATTORNEY.

Sept. 25, 1934.   J. M. MARTY   1,974,501
FOOD CUTTER
Filed July 3, 1933   4 Sheets-Sheet 2
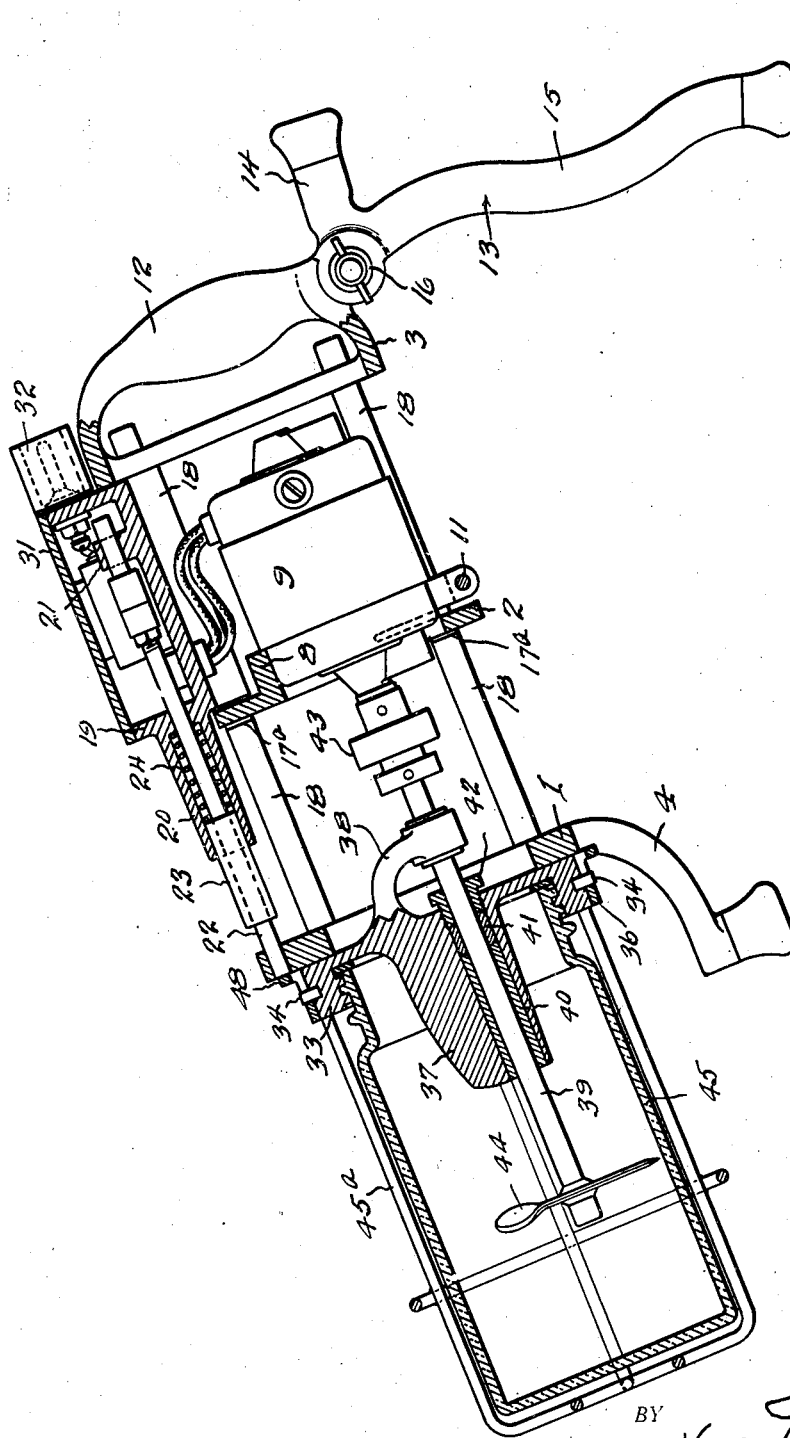
INVENTOR.
J. M. Marty
BY Hull, Brock & West
ATTORNEY.

Sept. 25, 1934. J. M. MARTY 1,974,501
FOOD CUTTER
Filed July 3, 1933 4 Sheets-Sheet 3

INVENTOR.
J. M. Marty
BY Hull, Brock Wish
ATTORNEY.

Sept. 25, 1934.　　J. M. MARTY　　1,974,501
FOOD CUTTER
Filed July 3, 1933　　4 Sheets-Sheet 4
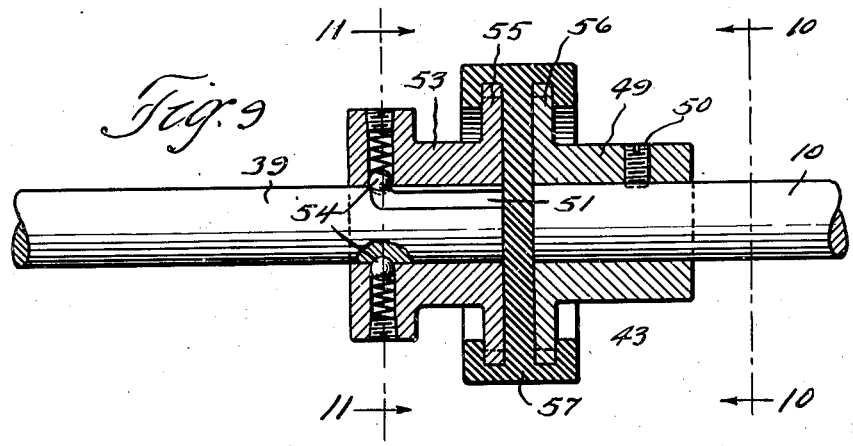
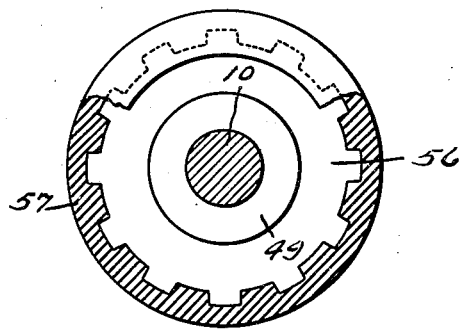
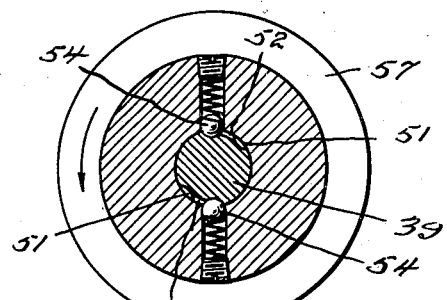
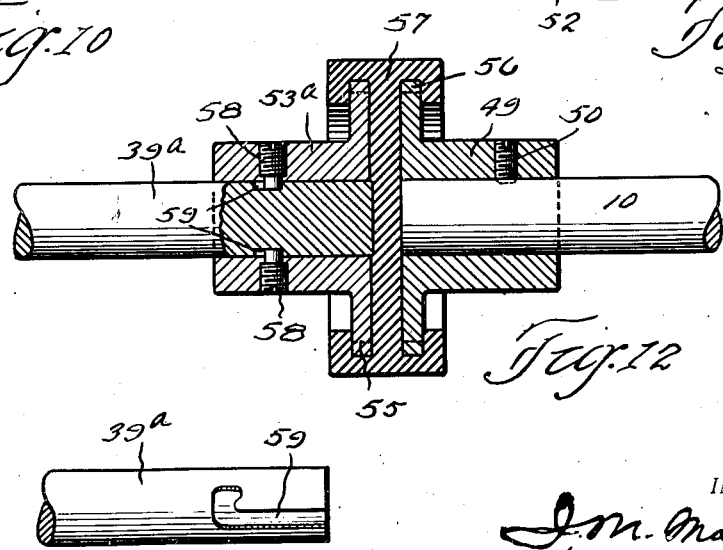
INVENTOR.
J. M. Marty
BY Hull, Brock & West
ATTORNEY.

Patented Sept. 25, 1934

1,974,501

UNITED STATES PATENT OFFICE 1,974,501

FOOD CUTTER

John M. Marty, Cleveland, Ohio

Application July 3, 1933, Serial No. 678,793

6 Claims. (Cl. 259—106)

This invention relates to a machine which is particularly adapted for cutting, disintegrating, shredding or mincing food products.

The main object of the invention is to provide a machine which will obviate the objections to the present methods of grating, cutting, shredding or grinding foods and to make possible the simple and quick preparation of foods from either a raw or a dehydrated condition into wholesome palatable foods in liquid or semi-solid form which may readily be used by invalids, infants and others having difficulty in masticating foods as ordinarily prepared.

My improved machine cuts the food into a very fine pulp and preserves all of the desirable elements without the necessity for straining in order to make the food acceptable and palatable. The machine may also be used for preparing foods in hospitals or for preserving or canning, or for breaking down the cell structure of foods without heating and without the use of any foreign substance, thus rendering it useful in connection with medical and industrial research.

Another object of the invention is to provide a machine of the character described which consists of few parts which are readily assembled and disassembled and which are adapted for production at a comparatively low cost.

A further object of the invention is to provide a machine of the character described which is efficient and dependable in operation and which can be cleaned with a minimum effort.

Another object of the invention is to provide a machine of the character described which is suitable for domestic use and is provided with safety attachments which tend to prevent accidental injury to the user.

Figure 4:
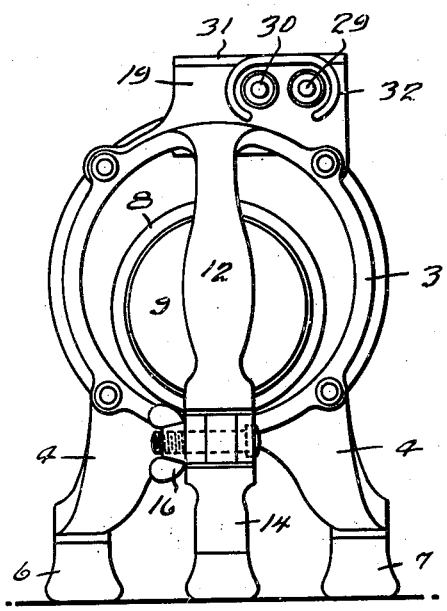
Figure 5:
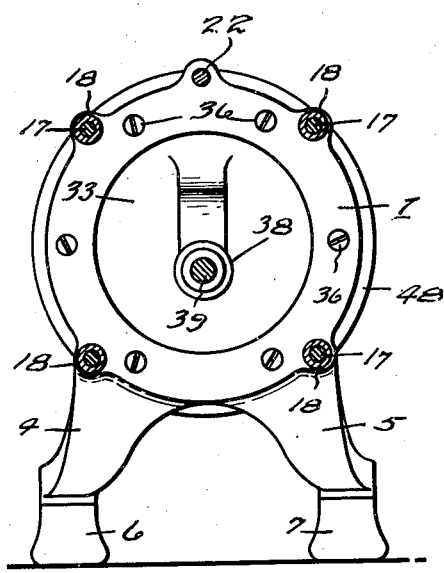
Figure 6:
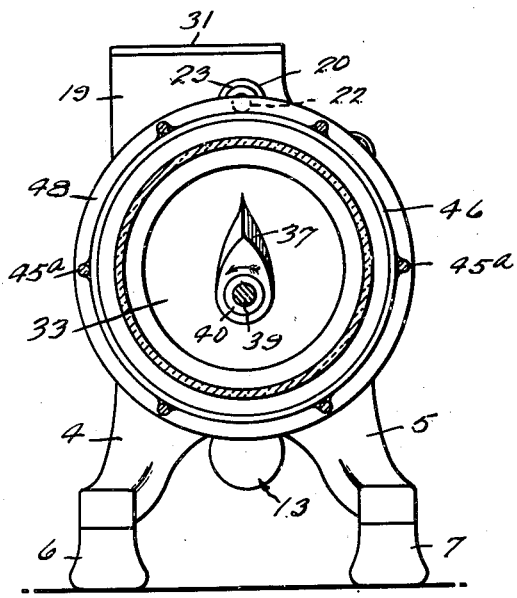
Figure 7:
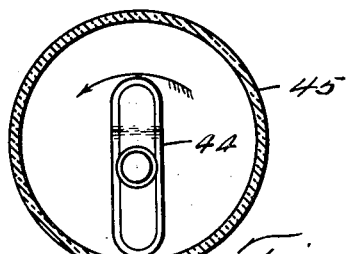
Figure 8:
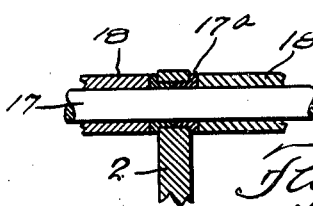

Further and more limited objects of the invention will appear as the description proceeds and by reference to the accompanying drawings in which Fig. 1 is a view in side elevation of my improved machine; Fig. 2 is a top plan view of the machine shown in Fig. 1; Fig. 3 is a vertical sectional view taken through the machine in the position which it occupies when in operation; Fig. 4 is an end view of the machine in the position shown in Fig. 1; Fig. 5 is a vertical sectional view on the line 5—5 of Fig. 1; Fig. 6 is a vertical sectional view on the line 6—6 of Fig. 1; Fig. 7 is a fragmentary sectional view showing the shape of the cutting blades and its position with respect to the container; Fig. 8 is a detail sectional view disclosing the manner of insulating the motor from the frame; Fig. 9 is a fragmentary vertical sectional view showing the flexible connection between the motor shaft and the cutter shaft; Fig. 10 is a sectional view on the line 10—10 of Fig. 9; Fig. 11 is a vertical sectional view on the line 11—11 of Fig. 9; Fig. 12 is a vertical sectional view disclosing a slightly modified form of flexible connection and Fig. 13 is a fragmentary plan view of one end of the cutter shaft used in the form of the invention shown in Fig. 12.

Referring now to the drawings, the machine consists essentially of a frame member which includes three castings identified by the reference characters 1, 2 and 3. The casting 1 is shaped in section as shown most clearly in Fig. 3 and is provided with an integrally formed pair of legs 4 and 5 which are provided with feet 6 and 7 formed of rubber or other suitable material. The body of the casting 1 is substantially annular in shape and provided with four spaced openings. The casting 2 is shown in section in Fig. 3 and is provided with an integrally formed annular flange 8 which is bifurcated at its lower end and adapted to receive therein an electric motor 9 having an armature shaft 10 projecting outwardly therefrom. The motor 9 is held in place by means of a screw 11 which extends through the bifurcated portions of the casting 2. The casting 3 is shown in section in Fig. 3 and in elevation in Figs. 1 and 2, and has formed integrally therewith an arm 12 to the lower end of which is pivotally secured a casting 13 having legs 14 and 15 of different length. The casting 13 is held in place by suitable thumb screws 16 and may be moved from the position shown in Fig. 1 to the position shown in Fig. 3. Extending through the castings 1, 2 and 3 and holding the same in spaced relation are four tie rods 17 over which are secured sleeves 18. The casting 2 is insulated from the tie rods 17 by means of flanged bushings 17ª formed of insulating material and fitting within the apertures therein, as shown most clearly in Fig. 8.

Mounted on top of the machine and disposed between the castings 2 and 3 is a casting 19 which is substantially rectangular in shape and provided with an annular sleeve-like extension 20. The bottom of the casting 19 is provided with an upstanding apertured boss 21 which forms a bearing for one end of a shaft 22, the opposite end of the shaft 22 extending through an opening provided in the casting 1. The shaft 22 is provided with a circular enlargement 23 one end of which is slidably received within the extension 20. A coil spring 24 arranged within the extension 20 normally urges the shaft toward the left, as shown in Fig 3.

Arranged within the casting 19 is a switch member 25 and carried by the shaft 22 is a block 26, one side of which is flat and engages with the inner wall of the casting. The block 26 is provided with a slot 27 which receives therein a switch arm 28. Extending through the wall of the casting 19 are a pair of prongs 29 and 30 which are adapted to receive a connector plug thereover. The top of the casting is closed by means of a cover 31 having an extension 32 which extends over the prongs 29 and 30. With the parts in the position shown in Figs. 1, 2 and 3, the switch is in position to make the circuit to the motor.

Secured to the front casting 1 is an annular block or ring member 33 in which are secured oppositely disposed pins 34, the purpose of which will hereinafter appear. The ring member 33 is secured to the casting 1 by means of screws 36. Formed integral with the ring member 33 is an apertured boss 37 on which is formed an arm 38 which forms a bearing for the cutter shaft 39. The boss 37 is also provided with a bearing 40 and packing 41 which is held in place by means of a packing gland nut 42. The shaft 39 is journaled in the bearing 40 and arm 38 and is connected with the armature shaft 10 of the motor by means of a flexible coupling 43 shown in detail in Figs. 9, 10 and 11. The boss 37 is shaped as shown in Fig. 6 and is disposed eccentric to the vertical axis of the casting 1, the purpose of which will hereinafter appear.

Carried by the shaft 40 is a cutter 44, one side of which is straight and the other side of which is disposed at an angle to the plane of rotation thereof as shown. The shaft 39 is driven from the motor 9 through the flexible connection 43. The interior of the ring member 33 is threaded and adapted to receive therein the neck of a suitable container 45 such as a well known Mason jar, in the manner shown in Fig. 3. Secured over the container 45 is a guard member 45a, the forward end of which is provided with a ring member 46 having bayonet slots 47 therein adapted to engage over the pins 34. The ring member 46 is provided with an annular upstanding flange 48 which is adapted to engage the end of the plunger 22 and move the same to a position to close the circuit to the motor. It will therefore be seen that the motor cannot be started until the guard member has been secured in place.

When it is desired to operate the machine to cut or mince food or other material, I first prepare a suitable amount of material to be minced, such as greenleaf vegetables, potatoes, meat or the like. The material should be first cut into fragments of convenient size. Dried fruit, such as prunes, olives, dates or the like, should have the pits removed and be cut into half or quarter size. Grains, such as dried beans, peas, etc., should first have all foreign substances removed. The material to be minced is placed in the container along with a small amount of water or other liquid. The casting 13 is then moved to the position shown in Fig. 3 and the motor switch closed, whereupon the cutter shaft and cutter will be rapidly rotated by the motor at a speed of from 1800 to 3000 revolutions per minute.

It will be seen that when the machine is in the operative position, the container is disposed at an angle to the horizontal. It will also be seen by referring to Fig. 6 that the cutter shaft 39 is disposed in eccentric relation to the container 45. The boss 37 is also disposed somewhat eccentric to the vertical axis of the container.

As the pitch of the cutter is greater on one side than on the other, it will be seen that the contents of the container will be given both a rotary motion and will also move along the opposite walls of the container in opposite directions, thus causing the particles within the container to be brought into repeated contact with the cutter. The purpose of adding the liquid is to facilitate agitation and to prevent the materials from adhering to the walls of the container. If desired, palatable and stimulating liquids may be used instead of the water to improve the taste of the food.

Secured to the shaft 10 is a hub 49 which is held against rotation with respect thereto by means of a threaded pin 50. The adjacent end of the shaft 39 is provided with a pair of oppositely disposed grooves 51 which extend axially of the shaft. Intersecting the groves 51 are a pair of circumferentially extending grooves 52. Fitting over the end of the shaft 39 is a hub 53 in which are arranged a pair of oppositely disposed spring pressed balls 54. The hubs 49 and 53 are provided with annular flanges 55 and 56 which are serrated about the peripheries thereof. Fitting over the hubs 53 and 59 and forming a flexible driving connection therebetween is an annular sleeve 57 which is formed of rubber and shaped in section as shown most clearly in Fig. 9. The shaft 39 may be readily detached from the hub 53 by turning the same in a direction as seen in Fig. 6. The ends of the grooves 52 are of less depth than the grooves 51 and the balls 54 engage in these grooves and form a driving connection between the shaft 39 and the hub 53. The collar 57 forms a flexible driving connection between the two shafts 39 and 10, even though these shafts may be slightly out of alignment.

In Figs. 12 and 13, there is disclosed a slightly modified form of driving connection in which the hub 53 is replaced by hub 53a having a pair of oppositely disposed pins 58 therein which are adapted to engage in curved slots 59 provided in the end of the shaft 39a. It will be seen that the opposite ends of the shafts 10 and 39a abut against the central web portion of the collar 57 and place the shafts under a slight tension, which tends to urge the shafts apart and to hold the pins 58 into engagement with the grooves 59 in the shaft 39a.

It will now be clear that I have provided a machine of the character described which will accomplish the objects of the invention as hereinbefore stated. It is to be understood that the embodiment of the invention herein disclosed is merely illustrative and not to be considered in a limiting sense as various changes may be made without departing from the spirit of my invention, for example, the container may be of any suitable material and the shape and size of the cutter and container may be changed in order to obtain proper agitation of the material. It is therefore to be understood that the invention is limited only in accordance with the scope of the appended claims.

Having thus described my invention, what I claim is:

1. In a machine of the character described, the combination of a closed stationary container, a cutter shaft extending into said container, a rotary cutter carried by said shaft, the pitch of one side of said cutter being greater than the other side thereof, a stationary baffle disposed immediately adjacent said shaft and extending therealong, means for rotating said shaft and cutter at a high rate of speed whereby to cause the contents of said container to surge back and forth along said shaft and into repeated contact with said cutter.

2. In a machine of the character described, the combination of a closed stationary container, a cutter shaft extending into said container, a rotary cutter carried by said shaft, the pitch of one side of said cutter being greater than the other side thereof, a stationary baffle disposed immediately adjacent said shaft and extending therealong, means for rotating said shaft and cutter at a high rate of speed whereby to cause the contents of said container to surge back and forth along said shaft and into repeated contact with said cutter, said shaft being disposed eccentric to the longitudinal axis of said container.

3. In a machine of the character described, the combination of a closed stationary container, a cutter shaft extending into said container, a rotary cutter carried by said shaft, the pitch of one side of said cutter being greater than the other side thereof, a stationary baffle disposed immediately adjacent said shaft and extending therealong, means for rotating said shaft and cutter at a high rate of speed whereby to cause the contents of said container to surge back and forth along said shaft and into repeated contact with said cutter, and means for moving said machine to a plurality of positions to support said container and shaft in different angular positions.

4. In a machine of the character described, the combination of a frame, an electric motor carried by said frame, a cutter shaft extending from said motor, a member carried by said frame and providing a support for a container and a bearing for said shaft, a container carried by said member, the outer end of said shaft being disposed within said container and having a rotary cutter secured thereto, and a baffle carried by said member and disposed immediately adjacent said shaft.

5. In a machine of the character described, the combination of a frame, an electric motor carried by said frame, a cutter shaft extending from said motor, a member carried by said frame and providing a support for a container and a bearing for said shaft, a container carried by said member, the outer end of said shaft being disposed within said container and having a rotary cutter secured thereto, and a baffle carried by said member and disposed immediately adjacent said shaft, said member serving also to close said container.

6. In a machine of the character described, the combination of a frame, an electric motor carried by said frame, a cutter shaft extending from said motor, a member carried by said frame and providing a support for a container and a bearing for said shaft, a container carried by said member, the outer end of said shaft being disposed within said container and having a rotary cutter secured thereto, and a baffle carried by said member and disposed immediately adjacent said shaft, said shaft and baffle being disposed eccentric to the longitudinal axis of said container.

JOHN M. MARTY.